(12) United States Patent
Wang et al.

(10) Patent No.: US 10,560,209 B2
(45) Date of Patent: Feb. 11, 2020

(54) OPTICAL SIGNAL TRANSMISSION METHOD, APPARATUS, AND SYSTEM

(71) Applicant: Huawei Technologies Co., Ltd., Shenzhen (CN)

(72) Inventors: Chuanbiao Wang, Wuhan (CN); Zhenwei Cui, Wuhan (CN); Xiaojun Zeng, Wuhan (CN); Xi Huang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/023,632

(22) Filed: Jun. 29, 2018

(65) Prior Publication Data
US 2018/0331776 A1    Nov. 15, 2018

Related U.S. Application Data

(63) Continuation of application No. PCT/CN2016/098297, filed on Sep. 7, 2016.

(30) Foreign Application Priority Data

Dec. 30, 2015    (CN) .......................... 2015 1 1023285

(51) Int. Cl.
    *H04J 14/02*    (2006.01)
    *H04B 10/25*    (2013.01)
    (Continued)

(52) U.S. Cl.
    CPC .............. *H04J 14/02* (2013.01); *H04B 10/25* (2013.01); *H04B 10/503* (2013.01); *H04B 10/5161* (2013.01)

(58) Field of Classification Search
    CPC .. H04B 10/25; H04B 10/503; H04B 10/5161; H04J 14/02
    (Continued)

(56) References Cited

U.S. PATENT DOCUMENTS

2003/0156841 A1    8/2003    Chraplyvy et al.
2004/0067014 A1*   4/2004    Hollars .............. G02B 6/29365
                                                          385/33
(Continued)

FOREIGN PATENT DOCUMENTS

CN    1552136 A    12/2004
CN    101174937 A   5/2008
(Continued)

OTHER PUBLICATIONS

Donovan et al; The impact of SWDM over multimode fiber; Oct. 26, 2015; Commonscope; pp. 1-6 (Year: 2015).*

*Primary Examiner* — Amritbir K Sandhu
(74) *Attorney, Agent, or Firm* — Leydig, Voit & Mayer, Ltd.

(57) ABSTRACT

Embodiments of the present invention disclose an optical signal transmission method, apparatus, and system. The apparatus includes a short wavelength division multiplexer, a signal processor, a first linear driver, a second linear driver, a first transmitter, and a second transmitter. The signal processor is configured to perform bit rate allocation and code pattern modulation on a received binary signal, to obtain a first electrical signal to be sent to the first linear driver and a second electrical signal to be sent to the second linear driver. It can be learnt that, by implementing the embodiments of the present invention, a quantity of wavelengths transmitted in a multimode optical fiber can be reduced by performing bit rate allocation on a binary signal, thereby reducing interference between channels in the optical fiber for optical signal transmission.

10 Claims, 10 Drawing Sheets

(51) Int. Cl.
*H04B 10/50* (2013.01)
*H04B 10/516* (2013.01)

(58) Field of Classification Search
USPC .......................................................... 398/79
See application file for complete search history.

(56) References Cited

U.S. PATENT DOCUMENTS

| | | | |
|---|---|---|---|
| 2004/0257992 A1 | 12/2004 | Dottling et al. | |
| 2009/0047025 A1* | 2/2009 | Hong | H04B 10/40 398/135 |
| 2011/0188860 A1* | 8/2011 | Li | H04B 10/6971 398/79 |
| 2015/0110491 A1* | 4/2015 | Gayrard | H03M 13/2906 398/79 |
| 2018/0191536 A1* | 7/2018 | Chen | H04B 10/5053 |
| 2018/0331776 A1* | 11/2018 | Wang | H04B 10/25 |
| 2019/0068292 A1* | 2/2019 | Zhu | H04B 10/2507 |

FOREIGN PATENT DOCUMENTS

| | | |
|---|---|---|
| CN | 101662326 A | 3/2010 |
| CN | 102136877 A | 7/2011 |
| CN | 102710362 A | 10/2012 |
| EP | 2306663 A1 | 4/2011 |

\* cited by examiner

OPTICAL SIGNAL TRANSMISSION METHOD, APPARATUS, AND SYSTEM

CROSS-REFERENCE TO RELATED APPLICATIONS

This application is a continuation of International Application No. PCT/CN2016/098297, filed on Sep. 7, 2016, which claims priority to Chinese Patent Application No. 201511023285.1, filed on Dec. 30, 2015. The disclosures of the aforementioned applications are hereby incorporated by reference in their entireties.

TECHNICAL FIELD

Embodiments of the present invention relate to the field of optoelectronic technologies, and specifically, to an optical signal transmission method, apparatus, and system.

BACKGROUND

Currently, by virtue of low power consumption, low costs, good interworking, and another advantage, a manner in which a vertical cavity surface emitting laser (VCSEL) works with a multimode optical fiber to transmit an optical signal is widely applied to data center interconnect (DCI). However, for an ordinary non-return to zero (NRZ) modulation system, performance of the system quickly degrades with an increase of a signal modulation rate and an increase of an optical fiber transmission length. When a total transmission capacity is unchanged, a single-channel transmission rate may be reduced by increasing a quantity of wavelengths, and therefore in theory, a wavelength division multiplexing (WDM) technology, such as a short-distance wavelength division multiplexing sWDM technology, can effectively improve a transmission capacity of the system.

The sWDM technology may reduce a single-channel transmission rate and a quantity of optical fiber resources. Currently, some manufacturers in the industry use a QSFP28 standard to implement 100-GE transmission, that is, to implement short distance interconnection four-wavelength transmission by using the sWDM technology. The four wavelengths are 855 nm, 883 nm, 915 nm, and 945 nm respectively, and a transmission rate of each channel is 25 Gbps. A transmission system for implementing short distance interconnection four-wavelength transmission may be shown in FIG. 1. FIG. 1 is a schematic structural diagram of a prior-art transmission system used for implementing short distance interconnection four-wavelength transmission. A transmit end bit stream is a binary signal carrying information; a limiting driver is configured to perform amplification and offset addition on the binary signal, to drive a voltage of a corresponding transmitter; the transmitter is configured to convert a received electrical signal into an optical signal; a short wavelength division multiplexer (SWD Mux) is configured to combine optical signals of four wavelengths into one optical fiber link; a wideband OM4 is configured to complete optical signal transmission; a short wavelength division demultiplexer (SWD Demux) is configured to demultiplex the optical signals of four wavelengths into different receivers; the receiver is configured to convert the optical signal into an electrical signal; and symbol determining is used to determine an analog electrical signal as a binary signal. However, spacings between the four wavelengths are relatively small and there is a large quantity of wavelengths. Consequently, there is interference between channels in the optical fiber during optical signal transmission.

SUMMARY

Embodiments of the present invention disclose an optical signal transmission method, apparatus, and system. This can reduce interference between channels in an optical fiber during optical signal transmission.

A first aspect of the embodiments of the present invention discloses an optical signal transmission apparatus, where the apparatus includes a short wavelength division multiplexer, the short wavelength division multiplexer is configured to connect to a multimode optical fiber, and the apparatus further includes a signal processor, a first linear driver, a second linear driver, a first transmitter, and a second transmitter, where the signal processor is configured to perform bit rate allocation and code pattern modulation (such as PAM4 modulation) on a received binary signal at a first bit rate, to obtain a first electrical signal to be sent to the first linear driver and a second electrical signal to be sent to the second linear driver; the first linear driver is configured to perform linear amplification processing and offset addition processing on the first electrical signal, to obtain a third electrical signal used to drive the first transmitter; the second linear driver is configured to perform linear amplification processing and offset addition processing on the second electrical signal, to obtain a fourth electrical signal used to drive the second transmitter; the first transmitter is configured to convert the third electrical signal into a first optical signal and send the first optical signal to the short wavelength division multiplexer; the second transmitter is configured to convert the fourth electrical signal into a second optical signal and send the second optical signal to the short wavelength division multiplexer; the short wavelength division multiplexer is configured to multiplex the first optical signal and the second optical signal to the multimode optical fiber for transmission; and a wavelength of the first optical signal may be $\lambda 1$, a wavelength of the second optical signal may be $\lambda 2$, and $\lambda 1$ is not equal to $\lambda 2$.

In a first possible implementation manner of the first aspect of the embodiments of the present invention, the signal processor includes a serializer/deserializer, a first 4 pulse amplitude modulation (PAM4) encoder, a second PAM4 encoder, a first transmitter digital signal processor, and a second transmitter digital signal processor, where the serializer/deserializer is configured to perform, according to features of the first transmitter and the second transmitter, bit rate allocation on the binary signal according to a proportion, to obtain a first non-return to zero (NRZ) signal, a second NRZ signal, a third NRZ signal, and a fourth NRZ signal; each of bit rates of the first NRZ signal and the second NRZ signal is a second bit rate; each of bit rates of the third NRZ signal and the fourth NRZ signal is a third bit rate; the proportion is equal to a value obtained by dividing the second bit rate by the third bit rate; the first bit rate is equal to a sum of twice the second bit rate and twice the third bit rate; the proportion is determined according to a bit error rate and a transmission distance, and a principle for determining the proportion may be ensuring a smallest bit error rate at a specific transmission distance;

the first PAM4 encoder is configured to perform PAM4 encoding on the first NRZ signal and the second NRZ signal to obtain a fifth electrical signal, where the first PAM4 encoder may directly perform PAM4 encoding on the first NRZ signal and the second NRZ signal to obtain the fifth electrical signal; or may first perform forward error correction encoding on the first NRZ signal and the second NRZ signal, and then perform PAM4 encoding to obtain the fifth electrical signal;

the second PAM4 encoder is configured to perform PAM4 encoding on the third NRZ signal and the fourth NRZ signal to obtain a sixth electrical signal, where the second PAM4 encoder may directly perform PAM4 encoding on the third NRZ signal and the fourth NRZ signal to obtain the sixth electrical signal; or may first perform forward error correction encoding on the third NRZ signal and the fourth NRZ signal, and then perform PAM4 encoding to obtain the sixth electrical signal;

the first transmitter digital signal processor is configured to perform an equalization operation on the fifth electrical signal, to remove an interference signal in the fifth electrical signal and obtain the first electrical signal; and the second transmitter digital signal processor is configured to perform an equalization operation on the sixth electrical signal, to remove an interference signal in the sixth electrical signal and obtain the second electrical signal; where the $\lambda 1$ may be 1310 nm, the $\lambda 2$ may be 850 nm, the first transmitter may be a 1310-nm directly modulated laser (DML), the second transmitter may be an 850-nm vertical cavity surface emitting laser (VCSEL), and the VCSEL and the DML are in one tube.

With reference to the first aspect of the embodiments of the present invention or the first possible implementation manner of the first aspect of the embodiments of the present invention, the short wavelength division multiplexer is a plastic lens, the plastic lens may be separately inclined to the VCSEL and the DML at an angle of 45 degrees, and the 1310-nm first optical signal can pass through the plastic lens, but the 850-nm second optical signal cannot pass through the plastic lens.

A second aspect of the embodiments of the present invention discloses another optical signal transmission apparatus, where the apparatus includes a short wavelength division demultiplexer, the short wavelength division demultiplexer is configured to connect to a multimode optical fiber, and the apparatus further includes a first linear receiver, a second linear receiver, and a signal processor, where the short wavelength division demultiplexer is configured to demultiplex optical signals that are at different wavelengths and received from the multimode optical fiber into a first optical signal to be sent to the first linear receiver and a second optical signal to be sent to the second linear receiver; the first linear receiver is configured to convert the first optical signal into a first electrical signal; the second linear receiver is configured to convert the second optical signal into a second electrical signal; the signal processor is configured to perform equalization and determining processing on the first electrical signal and the second electrical signal to obtain a binary signal, where a wavelength of the first optical signal is $\lambda 1$, a wavelength of the second optical signal is $\lambda 2$, and $\lambda 1$ is not equal to $\lambda 2$.

In a first possible implementation manner of the second aspect of the embodiments of the present invention, the signal processor includes a serializer/deserializer, a first PAM4 decoder, a second PAM4 decoder, a first receiver digital signal processor, and a second receiver digital signal processor, where the first receiver digital signal processor is configured to perform digital signal processing on the first electrical signal, to obtain a third electrical signal;

the second receiver digital signal processor is configured to perform digital signal processing on the second electrical signal, to obtain a fourth electrical signal;

the first PAM4 decoder is configured to perform PAM4 decoding on the third electrical signal to obtain a first NRZ signal and a second NRZ signal, where the first PAM4 decoder may first perform PAM4 decoding on the third electrical signal to obtain the first NRZ signal and the second NRZ signal, and then perform forward error correction decoding on the first NRZ signal and the second NRZ signal;

the second PAM4 decoder is configured to perform PAM4 decoding on the fourth electrical signal to obtain a third NRZ signal and a fourth NRZ signal, where the second PAM4 decoder may first perform PAM4 decoding on the fourth electrical signal to obtain the third NRZ signal and the fourth NRZ signal, and then perform forward error correction decoding on the third NRZ signal and the fourth NRZ signal; and the serializer/deserializer is configured to perform determining processing on the first NRZ signal, the second NRZ signal, the third NRZ signal, and the fourth NRZ signal, to obtain the binary signal, where the $\lambda 1$ may be 1310 nm, and the $\lambda 2$ may be 850 nm.

With reference to the second aspect of the embodiments of the present invention or the first possible implementation manner of the second aspect of the embodiments of the present invention, the short wavelength division demultiplexer includes a first plastic lens and a second plastic lens, where the first linear receiver and the second linear receiver may be receiver optical sub assemblies (ROSA); the first linear receiver receives the first optical signal whose wavelength is 1310 nm and that is reflected by the second plastic lens, and converts the first optical signal into the first electrical signal by using a photo-diode (PD) and a trans-impedance amplifier (TIA) that are in the first linear receiver; and the second linear receiver receives the second optical signal whose wavelength is 850 nm and that is reflected by the first plastic lens, and converts the second optical signal into the second electrical signal by using a PD and a TIA that are in the second linear receiver. The first optical signal whose wavelength is 1310 nm can pass through the first plastic lens, but the second optical signal whose wavelength is 850 nm cannot pass through the first plastic lens; and the first optical signal whose wavelength is 1310 nm cannot pass through the second plastic lens.

A third aspect of the embodiments of the present invention discloses an optical signal transmission method, and the method includes:

performing bit rate allocation and code pattern modulation on a received binary signal at a first bit rate, to obtain a first electrical signal and a second electrical signal;

performing linear amplification processing and offset addition processing on the first electrical signal to obtain a third electrical signal, and performing linear amplification processing and offset addition processing on the second electrical signal to obtain a fourth electrical signal;

performing electrical-to-optical conversion on the third electrical signal to obtain a first optical signal, and performing electrical-to-optical conversion on the fourth electrical signal to obtain a second optical signal; and multiplexing the first optical signal and the second optical signal to a multimode optical fiber for transmission.

In a first possible implementation manner of the third aspect of the embodiments of the present invention, the performing bit rate allocation and code pattern modulation on a received binary signal at a first bit rate, to obtain a first electrical signal and a second electrical signal includes:

performing bit rate allocation on the binary signal according to a proportion, to obtain a first NRZ signal, a second NRZ signal, a third NRZ signal, and a fourth NRZ signal, where each of bit rates of the first NRZ signal and the second NRZ signal is a second bit rate, each of bit rates of the third NRZ signal and the fourth NRZ signal is a third bit rate, and the proportion is equal to a value obtained by dividing the second bit rate by the third bit rate;

performing PAM4 encoding on the first NRZ signal and the second NRZ signal to obtain a fifth electrical signal, and performing PAM4 encoding on the third NRZ signal and the fourth NRZ signal to obtain a sixth electrical signal; and performing an equalization operation on the fifth electrical signal to obtain the first electrical signal, and performing an equalization operation on the sixth electrical signal to obtain the second electrical signal, where before PAM4 encoding is performed on the first NRZ signal and the second NRZ signal to obtain the fifth electrical signal, forward error correction encoding may further be performed on the first NRZ signal and the second NRZ signal; before PAM4 encoding is performed on the third NRZ signal and the fourth NRZ signal to obtain the sixth electrical signal, forward error correction encoding may further be performed on the third NRZ signal and the fourth NRZ signal; and this can reduce a bit error rate and improve reliability of optical signal transmission.

A fourth aspect of the embodiments of the present invention discloses another optical signal transmission method, and the method includes:

demultiplexing optical signals that are at different wavelengths and received from a multimode optical fiber into a first optical signal and a second optical signal;

converting the first optical signal into a first electrical signal, and converting the second optical signal into a second electrical signal; and performing equalization and determining processing on the first electrical signal and the second electrical signal, to obtain a binary signal.

In a first possible implementation manner of the fourth aspect of the embodiments of the present invention, the performing equalization and determining processing on the first electrical signal and the second electrical signal, to obtain a binary signal includes:

performing digital signal processing on the first electrical signal to obtain a third electrical signal, and performing digital signal processing on the second electrical signal to obtain a fourth electrical signal;

performing PAM4 decoding on the third electrical signal to obtain a first NRZ signal and a second NRZ signal, and performing PAM4 decoding on the fourth electrical signal to obtain a third NRZ signal and a fourth NRZ signal; and performing determining processing on the first NRZ signal, the second NRZ signal, the third NRZ signal, and the fourth NRZ signal, to obtain the binary signal, where after PAM4 decoding is performed on the third electrical signal to obtain the first NRZ signal and the second NRZ signal, forward error correction decoding may further be performed on the first NRZ signal and the second NRZ signal; after PAM4 decoding is performed on the fourth electrical signal to obtain the third NRZ signal and the fourth NRZ signal, forward error correction decoding may further be performed on the third NRZ signal and the fourth NRZ signal; and this can reduce a bit error rate and improve reliability of optical signal transmission.

A fifth aspect of the embodiments of the present invention discloses an optical signal transmission system, and the system includes the optical signal transmission apparatus and the multimode optical fiber that are disclosed in the first aspect of the embodiments of the present invention and the optical signal transmission apparatus disclosed in the second aspect of the embodiments of the present invention.

The optical signal transmission apparatus disclosed in the embodiments of the present invention may include a short wavelength division multiplexer, a signal processor, a first linear driver, a second linear driver, a first transmitter, and a second transmitter. The signal processor is configured to perform bit rate allocation and code pattern modulation on a received binary signal, to obtain a first electrical signal to be sent to the first linear driver and a second electrical signal to be sent to the second linear driver; the first linear driver is configured to perform linear amplification processing and offset addition processing on the first electrical signal, to obtain a third electrical signal used to drive the first transmitter; the second linear driver is configured to perform linear amplification processing and offset addition processing on the second electrical signal, to obtain a fourth electrical signal used to drive the second transmitter; the first transmitter is configured to convert the third electrical signal into a first optical signal and send the first optical signal to the short wavelength division multiplexer; the second transmitter is configured to convert the fourth electrical signal into a second optical signal and send the second optical signal to the short wavelength division multiplexer; and the short wavelength division multiplexer is configured to multiplex the first optical signal and the second optical signal to the multimode optical fiber for transmission. It can be learnt that by implementing the embodiments of the present invention, a quantity of wavelengths transmitted in a multimode optical fiber can be reduced by performing bit rate allocation on a binary signal, thereby reducing interference between channels in the optical fiber for optical signal transmission.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention disclose an optical signal transmission method, apparatus, and system, so that a quantity of wavelengths transmitted in a multimode optical fiber can be reduced by performing bit rate allocation on a received binary signal, thereby reducing interference between channels in the optical fiber for optical signal transmission. Details are separately illustrated in the following.

Figure 1:
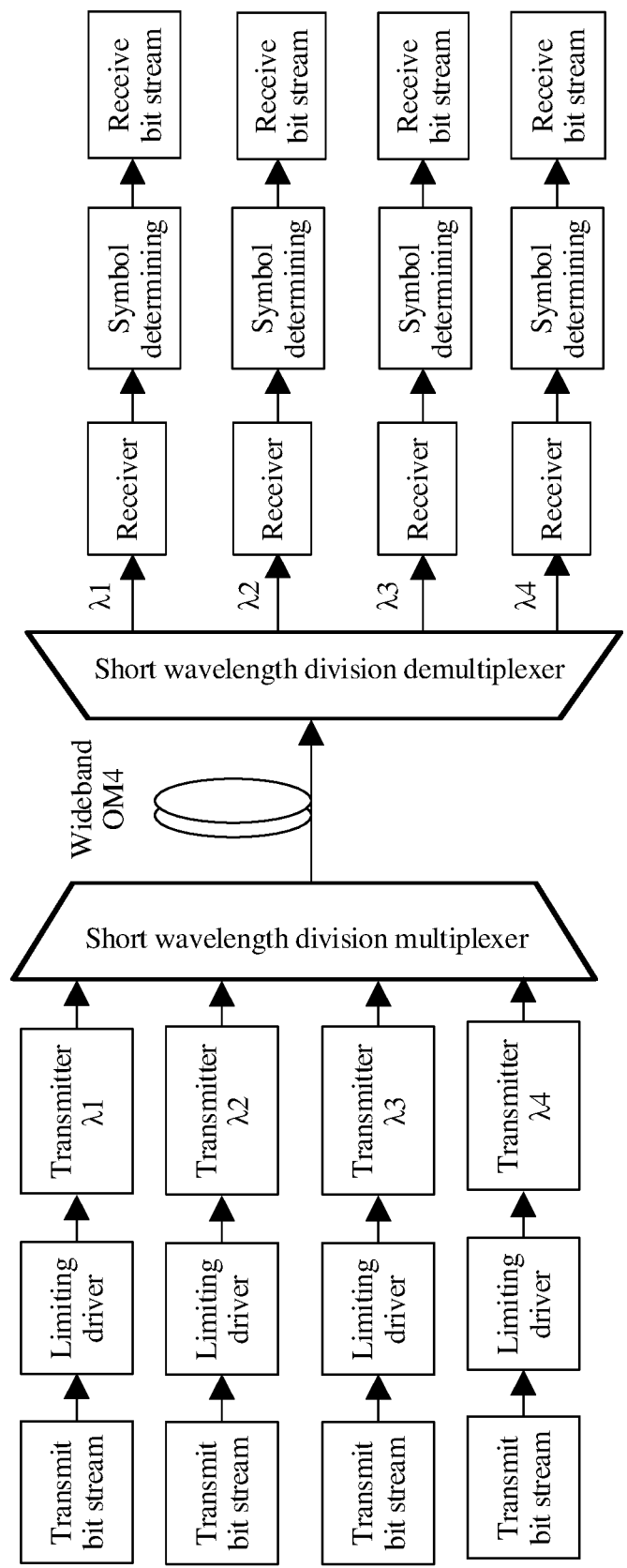
FIG. 1 is a schematic structural diagram of a prior-art transmission system used for implementing short distance interconnection four-wavelength transmission.
Figure 2:
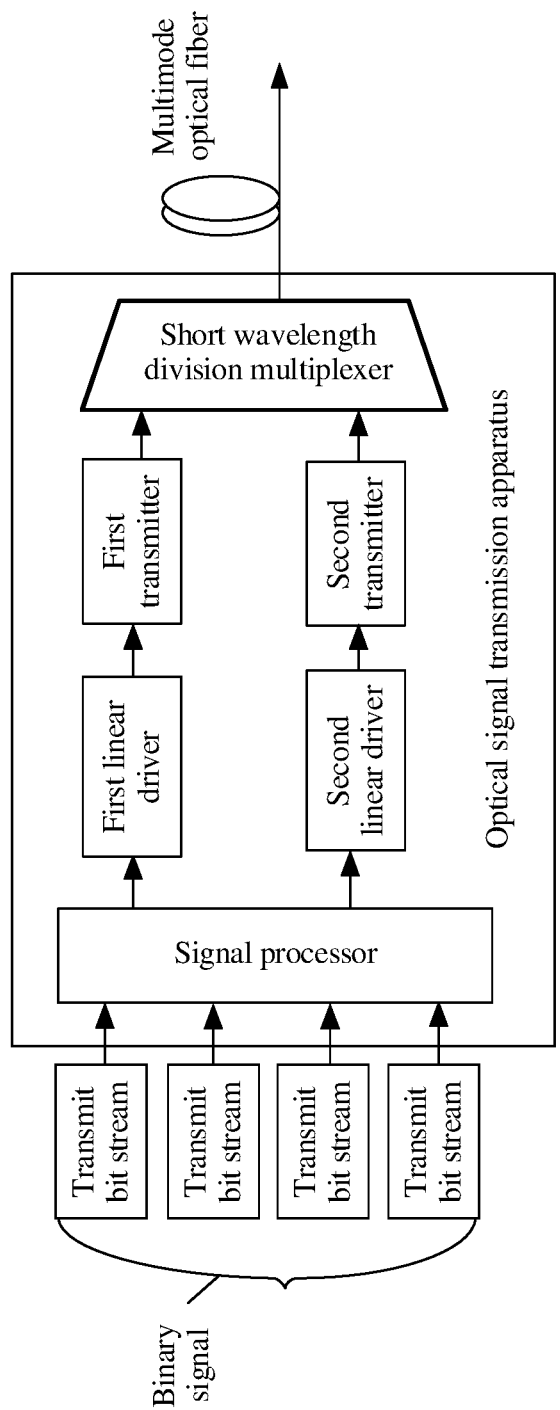
FIG. 2 is a schematic structural diagram of an optical signal transmission apparatus according to an embodiment of the present invention.

Referring to FIG. 2, FIG. 2 is a schematic structural diagram of an optical signal transmission apparatus according to an embodiment of the present invention. The transmission apparatus shown in FIG. 2 is configured to generate an optical signal. As shown in FIG. 2, the optical signal transmission apparatus may include a short wavelength division multiplexer, a signal processor, a first linear driver, a second linear driver, a first transmitter, and a second transmitter. The short wavelength division multiplexer is configured to connect to a multimode optical fiber; the first transmitter is configured to transmit an optical signal at a first wavelength $\lambda1$; and the second transmitter is configured to transmit an optical signal at a second wavelength $\lambda2$.

The signal processor is configured to perform bit rate allocation and code pattern modulation on a received binary signal at a first bit rate, to obtain a first electrical signal to be sent to the first linear driver and a second electrical signal to be sent to the second linear driver. The binary signal at the first bit rate is used to carry information and includes multiple transmit bit streams.

The first linear driver is configured to perform linear amplification processing and offset addition processing on the first electrical signal, to obtain a third electrical signal used to drive the first transmitter.

The second linear driver is configured to perform linear amplification processing and offset addition processing on the second electrical signal, to obtain a fourth electrical signal used to drive the second transmitter.

The first transmitter is configured to convert the third electrical signal into a first optical signal and send the first optical signal to the short wavelength division multiplexer. A wavelength of the first optical signal is the first wavelength $\lambda1$.

The second transmitter is configured to convert the fourth electrical signal into a second optical signal and send the second optical signal to the short wavelength division multiplexer. A wavelength of the second optical signal is the second wavelength $\lambda2$, and the second wavelength $\lambda2$ is not equal to the first wavelength $\lambda2$.

The short wavelength division multiplexer is configured to multiplex the first optical signal and the second optical signal to the multimode optical fiber for transmission, that is, optical signals transmitted in the multimode optical fiber are mixed optical signals of different wavelengths.

It can be learnt that the apparatus shown in FIG. 2 can reduce, by performing bit rate allocation on a binary signal, a quantity of wavelengths transmitted in a multimode optical fiber (reduce the quantity from original four wavelengths to two wavelengths) while ensuring that a total transmission capacity is unchanged, thereby reducing interference between channels in the optical fiber for optical signal transmission. In addition, only two transmitters with different wavelengths are used in FIG. 2, a quantity of transmission channels is reduced, and costs are reduced.

Figure 3:
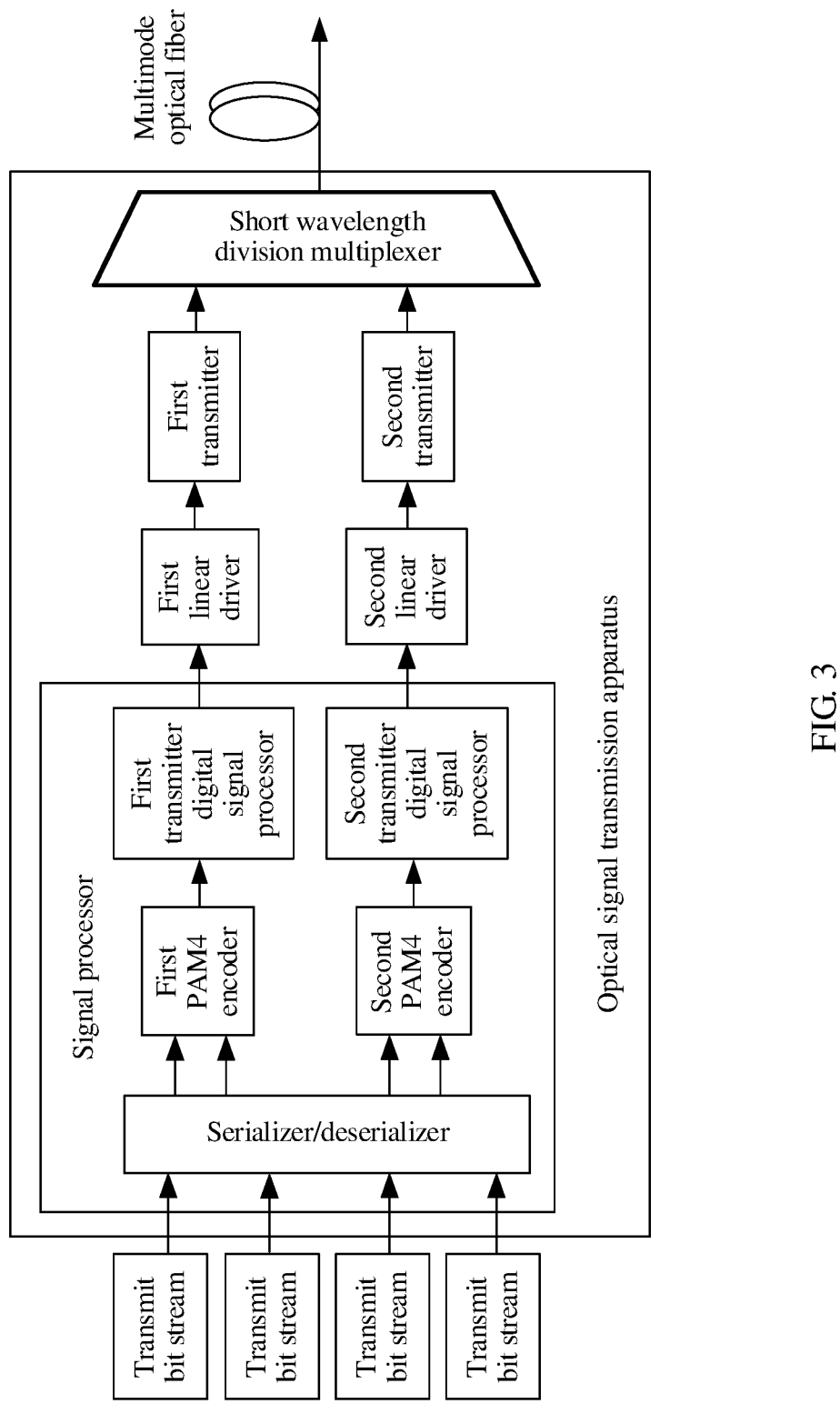
FIG. 3 is a schematic structural diagram of another optical signal transmission apparatus according to an embodiment of the present invention.

In an optional implementation manner, the signal processor may include a serializer/deserializer (Serdes), a first 4 pulse amplitude modulation (PAM4) encoder, a second PAM4 encoder, a first transmitter digital signal processor (TxDSP), and a second transmitter digital signal processor. In this case, a structure of the optical signal transmission apparatus may be shown in FIG. 3. FIG. 3 is a schematic structural diagram of another optical signal transmission apparatus according to an embodiment of the present invention.

The serializer/deserializer is configured to perform, according to performance of the first transmitter and the second transmitter, bit rate allocation on the binary signal at the first bit rate according to a proportion, to obtain a first non-return to zero (NRZ) signal, a second NRZ signal, a third NRZ signal, and a fourth NRZ signal. Each of bit rates of the first NRZ signal and the second NRZ signal is a second bit rate; each of bit rates of the third NRZ signal and the fourth NRZ signal is a third bit rate; the proportion is equal to a value obtained by dividing the second bit rate by the third bit rate; the first bit rate is equal to a sum of twice the second bit rate and twice the third bit rate; and the proportion may be determined according to a bit error rate and a transmission distance, and a principle for determining the proportion may be ensuring a smallest bit error rate at a specific transmission distance.

The first PAM4 encoder is configured to perform PAM4 encoding on the first NRZ signal and the second NRZ signal to obtain a fifth electrical signal.

Optionally, the first PAM4 encoder may directly perform PAM4 encoding on the first NRZ signal and the second NRZ signal to obtain the fifth electrical signal; or the first PAM4 encoder may first perform forward error correction encoding on the first NRZ signal and the second NRZ signal, and then perform PAM4 encoding to obtain the fifth electrical signal, and this can reduce a bit error rate, and improve reliability of subsequent optical signal transmission.

The second PAM4 encoder is configured to perform PAM4 encoding on the third NRZ signal and the fourth NRZ signal to obtain a sixth electrical signal.

Optionally, the second PAM4 encoder may directly perform PAM4 encoding on the third NRZ signal and the fourth NRZ signal to obtain the sixth electrical signal; or the second PAM4 encoder may first perform forward error correction encoding on the third NRZ signal and the fourth NRZ signal, and then perform PAM4 encoding to obtain the sixth electrical signal, and this can reduce a bit error rate, and improve reliability of subsequent optical signal transmission.

The first transmitter digital signal processor is configured to perform an equalization operation on the fifth electrical signal, to obtain the first electrical signal, that is, remove an interference signal in the fifth electrical signal.

The second transmitter digital signal processor is configured to perform an equalization operation on the sixth electrical signal, to obtain the second electrical signal, that is, remove an interference signal in the sixth electrical signal.

The first wavelength λ1 may be 1310 nm, and the second wavelength λ2 may be 850 nm.

Figure 11:
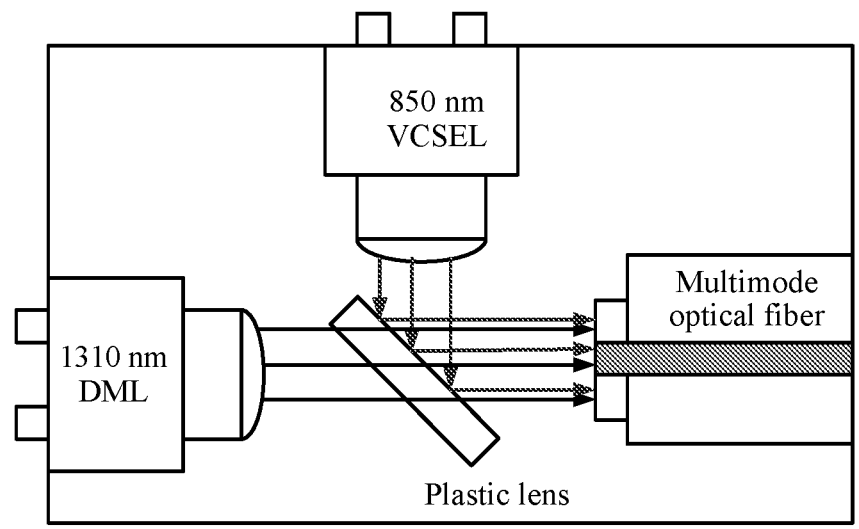
FIG. 11 is a schematic diagram of a location relationship among a transmitter, a short wavelength division multiplexer, and a multimode optical fiber according to an embodiment of the present invention.

Optionally, the short wavelength division multiplexer may be a plastic lens, and a location relationship among the short wavelength division multiplexer, the first transmitter, the second transmitter, and the multimode optical fiber may be shown in FIG. 11. FIG. 11 is a schematic diagram of a location relationship among a transmitter, a short wavelength division multiplexer, and a multimode optical fiber according to an embodiment of the present invention. The first transmitter is a 1310-nm directly modulated laser (DML), the second transmitter is an 850-nm vertical cavity surface emitting laser (VCSEL), and the VCSEL and the DML are in one tube. Based on modulation of the third electrical signal (such as a current signal) output by the first linear driver, the DML transmits a first optical signal whose wavelength is 1310 nm; and based on modulation of the fourth electrical signal (such as a current signal) output by the second linear driver, the VCSEL transmits a second optical signal whose wavelength is 850 nm. After being collimated through lenses, the first optical signal whose wavelength is 1310 nm and the second optical signal whose wavelength is 850 nm are reflected and coupled by a plastic lens that is separately inclined to the VCSEL and the DML at an angle of 45 degrees, and then the first optical signal whose wavelength is 1310 nm and the second optical signal whose wavelength is 850 nm are coupled to the multimode optical fiber for transmission. The first optical signal whose wavelength is 1310 nm can pass through the plastic lens, but the second optical signal whose wavelength is 850 nm cannot pass through the plastic lens (that is, the 850-nm second optical signal can only be reflected by the plastic lens).

Optionally, an encoding mapping table of the PAM4 encoder may be shown in Table 1.

TABLE 1

Encoding mapping table of the PAM4 encoder

| Input bit pair of PAM4 encoder | | Output of PAM4 encoder |
|---|---|---|
| 0 | 0 | 0 |
| 0 | 1 | 1 |
| 1 | 0 | 3 |
| 1 | 1 | 2 |

It can be learnt that the transmission apparatus shown in FIG. 3 can reduce, by using a PAM4 high modulation technology, a quantity of wavelengths when transmission capacities are the same, thereby reducing a quantity of photoelectric devices and reducing costs; and reduce a quantity of wavelengths in a multimode optical fiber by performing bit rate allocation on a binary signal, thereby reducing interference between channels in the optical fiber for optical signal transmission. Use of two transmitters reduces a quantity of transmission channels, thereby reducing crosstalk between transmission channels; a clock programmable serializer/deserializer is used to adjust a channel baud rate of a transmission channel according to performance of a transmitter, so as to implement equalization of the apparatus and optimize transmission performance; and a wavelength spacing between transmitted optical signals exceeds 200 nm, thereby reducing wavelength sensitivity of a plastic lens and another photoelectric device.

Figure 4:
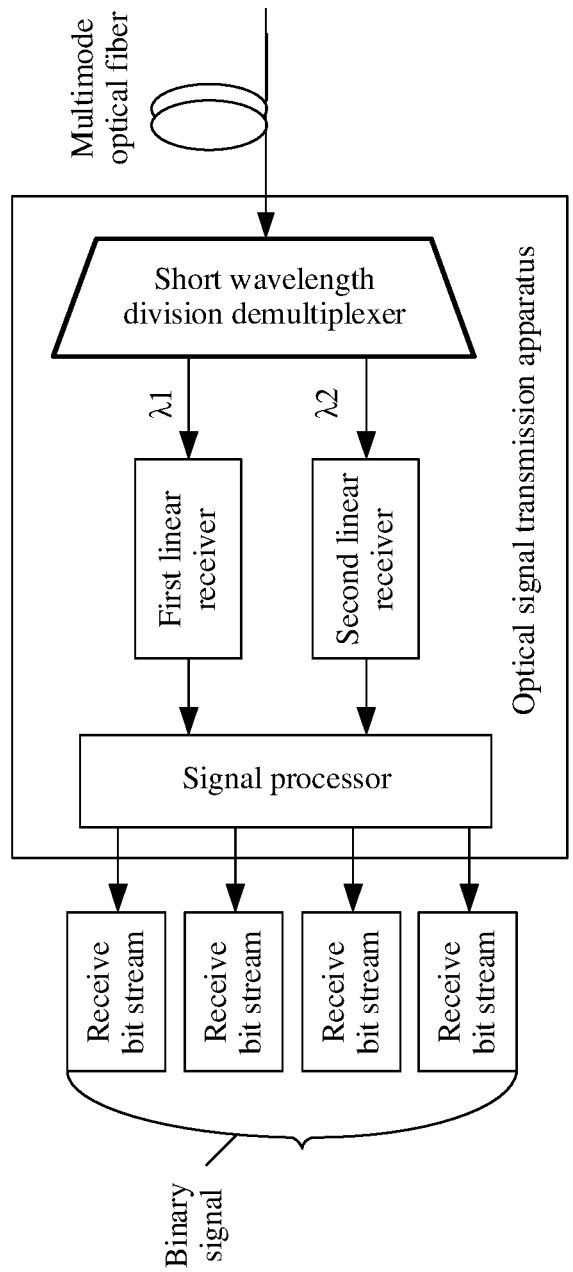
FIG. 4 is a schematic structural diagram of still another optical signal transmission apparatus according to an embodiment of the present invention.

Referring to FIG. 4, FIG. 4 is a schematic structural diagram of another optical signal transmission apparatus according to an embodiment of the present invention. The transmission apparatus shown in FIG. 4 is configured to receive an optical signal and convert the received optical signal into a binary signal. As shown in FIG. 4, the optical signal transmission apparatus may include a short wavelength division demultiplexer (SWD Demux), a first linear receiver, a second linear receiver, and a signal processor. The short wavelength division demultiplexer is configured to connect to a multimode optical fiber, and the multimode optical fiber is further configured to connect short wavelength division multiplexer in the transmission apparatus shown in FIG. 2 or FIG. 3.

The short wavelength division demultiplexer is configured to demultiplex mixed optical signals that are at different wavelengths and received from the multimode optical fiber into a first optical signal to be sent to the first linear receiver and a second optical signal to be sent to the second linear receiver. A wavelength of the first optical signal is λ1 and a wavelength of the second optical signal is λ2, and λ1 is not equal to λ2.

The first linear receiver is configured to convert the first optical signal sent by the short wavelength division demultiplexer into a first electrical signal.

The second linear receiver is configured to convert the second optical signal sent by the short wavelength division demultiplexer into a second electrical signal.

The signal processor is configured to perform equalization and determining processing on the first electrical signal and the second electrical signal, to obtain a binary signal.

Figure 5:
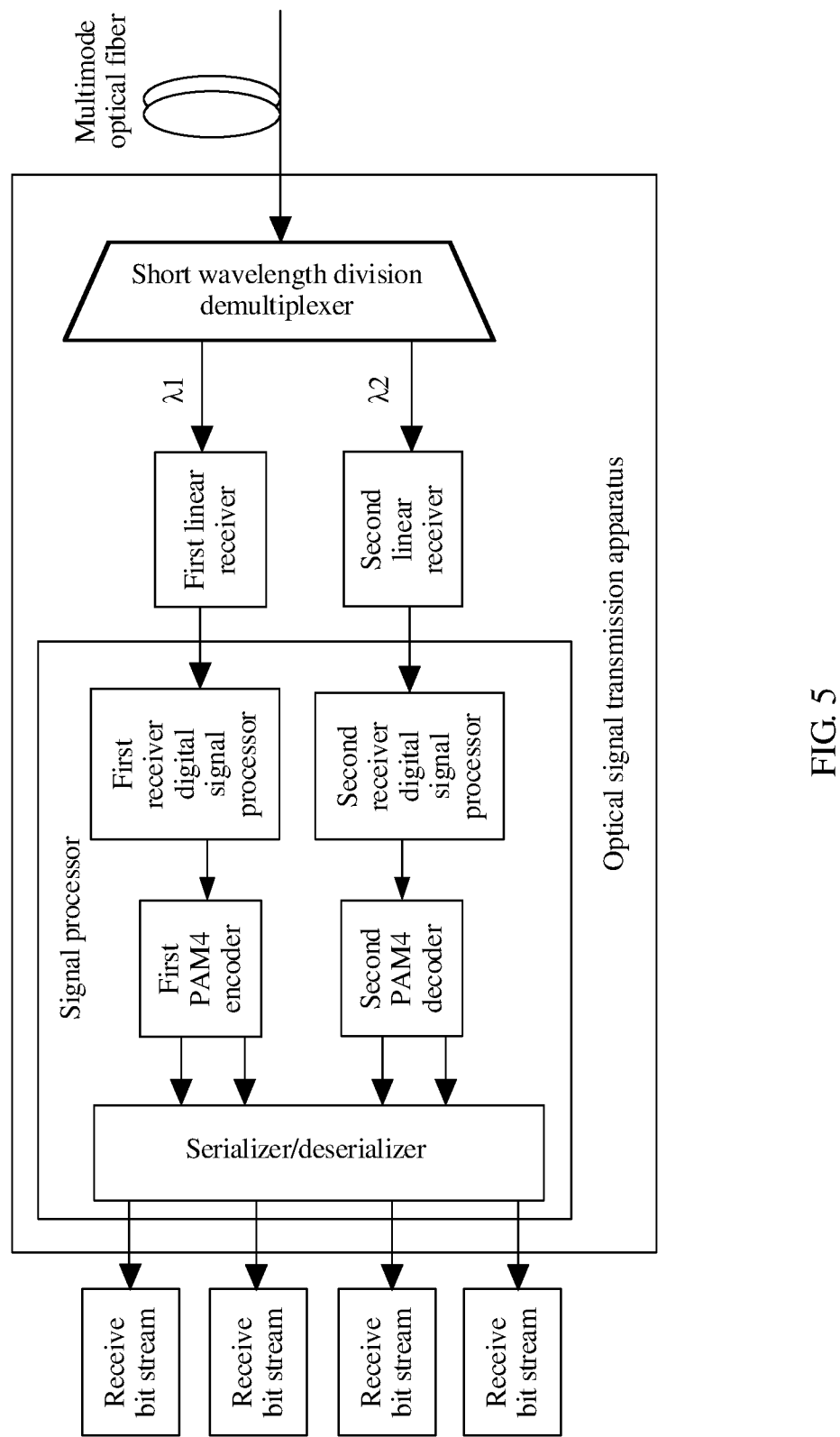
FIG. 5 is a schematic structural diagram of still another optical signal transmission apparatus according to an embodiment of the present invention.

In an optional implementation manner, the signal processor in FIG. 4 may include a serializer/deserializer, a first PAM4 decoder, a second PAM4 decoder, a first receiver digital signal processor (RxDSP), and a second receiver digital signal processor. In this case, a structure of the optical signal transmission apparatus may be shown in FIG. 5. FIG. 5 is a schematic structural diagram of another optical signal transmission apparatus according to an embodiment of the present invention.

The first receiver digital signal processor is configured to perform digital signal processing on the first electrical signal sent by the first linear receiver, to obtain a third electrical signal.

The second receiver digital signal processor is configured to perform digital signal processing on the second electrical signal sent by the second linear receiver, to obtain a fourth electrical signal.

The first PAM4 decoder is configured to perform PAM4 decoding on the third electrical signal to obtain a first NRZ signal and a second NRZ signal.

Optionally, the first PAM4 decoder may first perform PAM4 decoding on the third electrical signal to obtain the first NRZ signal and the second NRZ signal, and then perform forward error correction decoding on the first NRZ signal and the second NRZ signal that are obtained by decoding. This can reduce a bit error rate and improve reliability of optical signal transmission.

The second PAM4 decoder is configured to perform PAM4 decoding on the fourth electrical signal to obtain a third NRZ signal and a fourth NRZ signal.

Optionally, the second PAM4 decoder may first perform PAM4 decoding on the fourth electrical signal to obtain the third NRZ signal and the fourth NRZ signal, and then perform forward error correction decoding on the third NRZ signal and the fourth NRZ signal that are obtained by decoding.

The serializer/deserializer is configured to perform determining processing on the first NRZ signal, the second NRZ signal, the third NRZ signal, and the fourth NRZ signal, to obtain the binary signal, and output the obtained binary signal. The binary signal includes receive bit streams with a same bit rate.

The first wavelength $\lambda 1$ may be 1310 nm, and the second wavelength $\lambda 2$ may be 850 nm.

Figure 12:
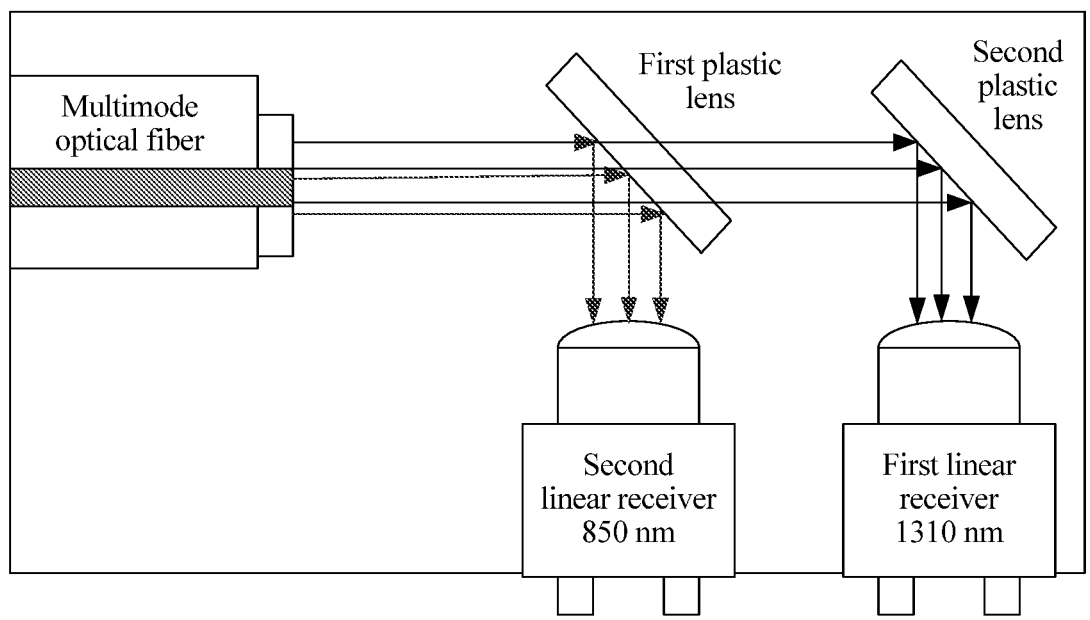
FIG. 12 is a schematic diagram of a location relationship among a linear receiver, a multimode optical fiber, and a short wavelength division demultiplexer according to an embodiment of the present invention.

Optionally, the short wavelength division demultiplexer may include a first plastic lens and a second plastic lens, and a location relationship among the short wavelength division demultiplexer, the first linear receiver, the second linear receiver, and the multimode optical fiber may be shown in FIG. 12. FIG. 12 is a schematic diagram of a location relationship among a linear receiver, a multimode optical fiber, and a short wavelength division demultiplexer according to an embodiment of the present invention. Both the first linear receiver and the second linear receiver may be a receiver optical sub assembly (ROSA); and the first linear receiver and the second linear receiver are in one tube. The first linear receiver receives the first optical signal whose wavelength is 1310 nm and that is reflected by the second plastic lens, and converts the first optical signal into the first electrical signal by using a photo-diode (PD) and a transimpedance amplifier (TIA) that are in the first linear receiver; and the second linear receiver receives the second optical signal whose wavelength is 850 nm and that is reflected by the first plastic lens, and converts the second optical signal into the second electrical signal by using a PD and a TIA that are in the second linear receiver. The first optical signal whose wavelength is 1310 nm can pass through the first plastic lens, but the second optical signal whose wavelength is 850 nm cannot pass through the first plastic lens; and the first optical signal whose wavelength is 1310 nm cannot pass through the second plastic lens.

Optionally, a decoding mapping table of the PAM4 decoder may be shown in Table 2 corresponding to Table 1.

TABLE 2

Decoding mapping table of the PAM4 decoder

| Input of PAM4 decoder | Output bit pair of PAM4 decoder | |
|---|---|---|
| 0 | 0 | 0 |
| 1 | 0 | 1 |
| 3 | 1 | 0 |
| 2 | 1 | 1 |

In this embodiment of the present invention, the first optical signal whose wavelength is 1310 has a relatively long optical path and passes through more lenses, and consequently, an insertion loss is great. However, a signal-mode (1310 nm) receiver (the first linear receiver) corresponding to the first optical signal has relatively high responsivity. The second optical signal whose wavelength is 850 nm has a relatively short optical path and needs to be reflected by only one lens. However, a multi-mode (850 nm) receiver (the second linear receiver) corresponding to the second optical signal has relatively low responsivity. It can be learnt that a proper layout of components in the optical signal transmission apparatus in this embodiment of the present invention can balance a responsivity difference between the signal-mode (1310 nm) receiver (the first linear receiver) and the multi-mode (850 nm) receiver (the second linear receiver) in terms of performance. This ensures that when receivers have same power, electrical signals output by the two receivers have relatively good consistency in terms of amplitude and bit error feature; a wavelength spacing between two optical signals exceeds 200 nm, so that mutual interference between two transmission channels is reduced; and in addition, there are few photoelectric devices in the apparatus (for example, there are only two linear receivers), so that costs are reduced.

Figure 6:
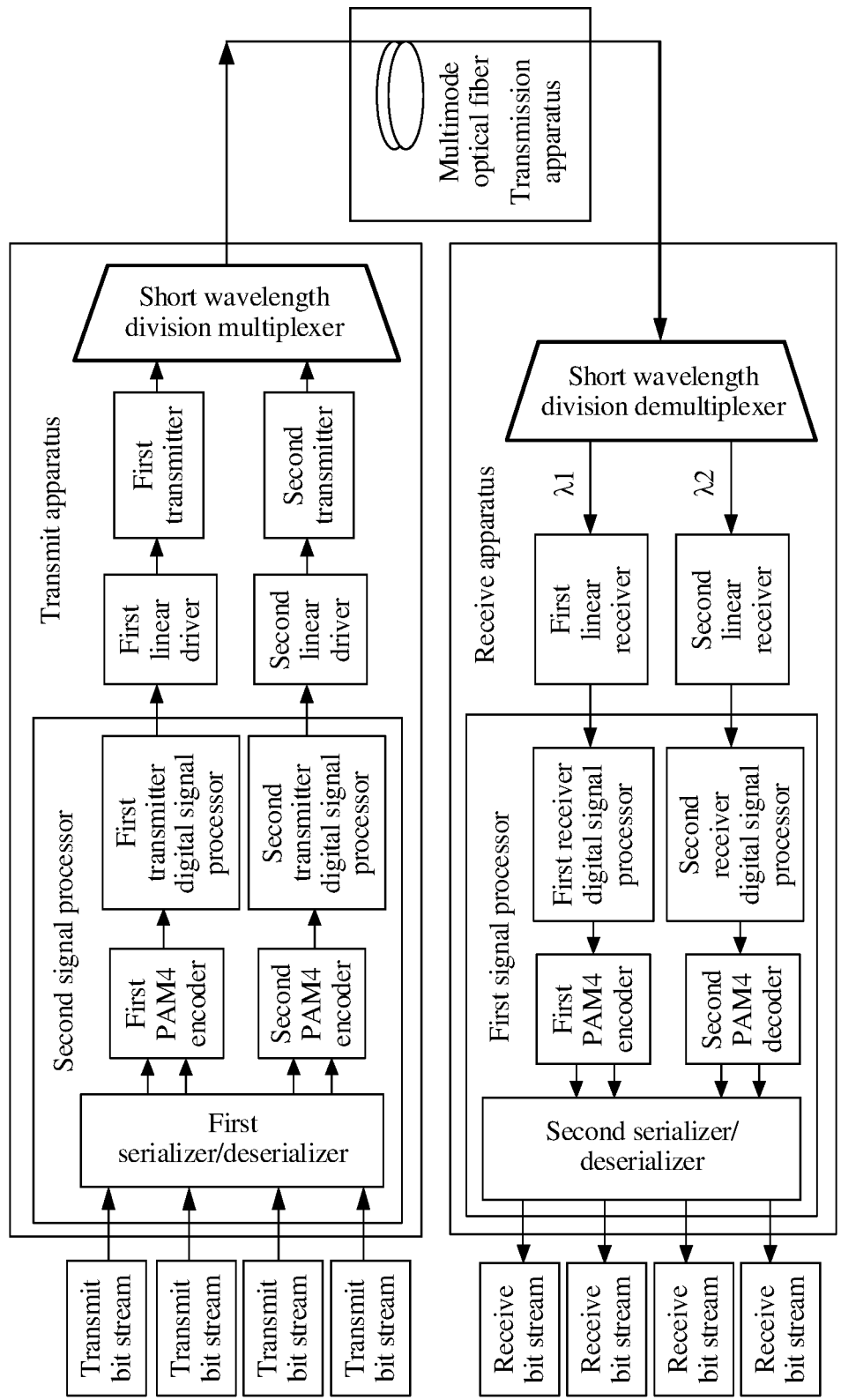
FIG. 6 is a schematic structural diagram of an optical signal transmission system according to an embodiment of the present invention.

Referring to FIG. 6, FIG. 6 is a schematic structural diagram of an optical signal transmission system according to an embodiment of the present invention. As shown in FIG. 6, the optical signal transmission system may include a transmit apparatus, a transmission apparatus, and a receiving apparatus. The transmit apparatus may include a short wavelength division multiplexer, a first signal processor, a first linear driver, a second linear driver, a first transmitter, and a second transmitter. The receiving apparatus may include a short wavelength division demultiplexer, a first linear receiver, a second linear receiver, and a second signal processor. The transmission apparatus may be a multimode optical fiber, and the short wavelength division multiplexer connects to the short wavelength division demultiplexer by using the multimode optical fiber.

The first signal processor is configured to perform bit rate allocation and code pattern modulation on a received binary signal at a first bit rate, to obtain a first electrical signal to be sent to the first linear driver and a second electrical signal to be sent to the second linear driver. The binary signal at the first bit rate is used to carry information and includes multiple transmit bit streams.

The first linear driver is configured to perform linear amplification processing and offset addition processing on the first electrical signal, to obtain a third electrical signal used to drive the first transmitter.

The second linear driver is configured to perform linear amplification processing and offset addition processing on the second electrical signal, to obtain a fourth electrical signal used to drive the second transmitter.

The first transmitter is configured to convert the third electrical signal into a first optical signal and send the first optical signal to the short wavelength division multiplexer, where a wavelength of the first optical signal is a first wavelength $\lambda 1$.

The second transmitter is configured to convert the fourth electrical signal into a second optical signal and send the second optical signal to the short wavelength division multiplexer, where a wavelength of the second optical signal is a second wavelength $\lambda 2$, and the second wavelength $\lambda 2$ is not equal to the first wavelength $\lambda 1$.

The short wavelength division multiplexer is configured to multiplex the first optical signal and the second optical signal to the multimode optical fiber for transmission, that is, optical signals transmitted in the multimode optical fiber are mixed optical signals of different wavelengths.

The multimode optical fiber is configured to transmit the optical signals (mixed optical signals) that are of different wavelengths and received from the short wavelength division multiplexer to the short wavelength division demultiplexer.

The short wavelength division demultiplexer is configured to demultiplex the optical signals that are at different wavelengths and received from the multimode optical fiber into a third optical signal to be sent to the first linear receiver and a fourth optical signal to be sent to the second linear receiver. A wavelength of the third optical signal is $\lambda 1$, and a wavelength of the fourth optical signal is $\lambda 2$.

The first linear receiver is configured to convert the third optical signal into a seventh electrical signal.

The second linear receiver is configured to convert the fourth optical signal into an eighth electrical signal.

The second signal processor is configured to: perform equalization and determining processing on the seventh electrical signal and the eighth electrical signal, to obtain a binary signal, and output the binary signal.

In an optional implementation manner, as shown in FIG. 6, the first signal processor may include a first serializer/deserializer, a first PAM4 encoder, a second PAM4 encoder, a first transmitter digital signal processor, and a second transmitter digital signal processor.

The first serializer/deserializer is configured to perform, according to performance of the first transmitter and the second transmitter, bit rate allocation on the received binary signal at the first bit rate according to a proportion, to obtain a first NRZ signal, a second NRZ signal, a third NRZ signal, and a fourth NRZ signal. Each of bit rates of the first NRZ signal and the second NRZ signal is a second bit rate; each of bit rates of the third NRZ signal and the fourth NRZ signal is a third bit rate; the proportion is equal to a value obtained by dividing the second bit rate by the third bit rate; the first bit rate is equal to a sum of twice the second bit rate and twice the third bit rate; and the proportion may be determined according to a bit error rate and a transmission distance, and a principle for determining the proportion may be ensuring a smallest bit error rate at a specific transmission distance.

The first PAM4 encoder is configured to perform PAM4 encoding on the first NRZ signal and the second NRZ signal to obtain a fifth electrical signal.

Optionally, the first PAM4 encoder may directly perform PAM4 encoding on the first NRZ signal and the second NRZ signal to obtain the fifth electrical signal; or the first PAM4 encoder may first perform forward error correction encoding on the first NRZ signal and the second NRZ signal, and then perform PAM4 encoding to obtain the fifth electrical signal, and this can reduce a bit error rate, and improve reliability of subsequent optical signal transmission.

The second PAM4 encoder is configured to perform PAM4 encoding on the third NRZ signal and the fourth NRZ signal to obtain a sixth electrical signal.

Optionally, the second PAM4 encoder may directly perform PAM4 encoding on the third NRZ signal and the fourth NRZ signal to obtain the sixth electrical signal; or the second PAM4 encoder may first perform forward error correction encoding on the third NRZ signal and the fourth NRZ signal, and then perform PAM4 encoding to obtain the sixth electrical signal, and this can reduce a bit error rate, and improve reliability of subsequent optical signal transmission.

The first transmitter digital signal processor is configured to perform an equalization operation on the fifth electrical signal, to obtain the first electrical signal.

The second transmitter digital signal processor is configured to perform an equalization operation on the sixth electrical signal, to obtain the second electrical signal.

The first PAM4 encoder and the second PAM4 encoder may perform PAM4 encoding according to the encoding mapping table shown in Table 1.

In this optional embodiment, as shown in FIG. 6, the second signal processor may include a second serializer/deserializer, a first PAM4 decoder, a second PAM4 decoder, a first receiver digital signal processor, and a second receiver digital signal processor.

The first receiver digital signal processor is configured to perform digital signal processing on the seventh electrical signal, to obtain a ninth electrical signal.

The second receiver digital signal processor is configured to perform digital signal processing on the eighth electrical signal, to obtain a tenth electrical signal.

The first PAM4 decoder is configured to perform PAM4 decoding on the ninth electrical signal to obtain a fifth NRZ signal and a sixth NRZ signal.

Optionally, the first PAM4 decoder may first perform PAM4 decoding on the ninth electrical signal to obtain the fifth NRZ signal and the sixth NRZ signal, and then perform forward error correction decoding on the fifth NRZ signal and the sixth NRZ signal that are obtained by decoding. This can reduce a bit error rate and improve reliability of optical signal transmission.

The second PAM4 decoder is configured to perform PAM4 decoding on the tenth electrical signal to obtain a seventh NRZ signal and an eighth NRZ signal.

Optionally, the second PAM4 decoder may first perform PAM4 decoding on the tenth electrical signal to obtain the seventh NRZ signal and the eighth NRZ signal, and then perform forward error correction decoding on the seventh NRZ signal and the eighth NRZ signal that are obtained by decoding. This can reduce a bit error rate and improve reliability of optical signal transmission.

The second serializer/deserializer is configured to: perform determining processing on the fifth NRZ signal, the sixth NRZ signal, the seventh NRZ signal, and the eighth NRZ signal, to obtain the binary signal, and output the binary signal.

The first wavelength $\lambda 1$ may be 1310 nm, and the second wavelength $\lambda 2$ may be 850 nm.

Optionally, the short wavelength division multiplexer may be a plastic lens, a location relationship among the short wavelength division multiplexer, the first transmitter, the second transmitter, and the multimode optical fiber may be shown in FIG. 11, and details are not described in this embodiment of the present invention.

Optionally, the short wavelength division demultiplexer may include a first plastic lens and a second plastic lens, a location relationship among the short wavelength division demultiplexer, the first linear receiver, the second linear receiver, and the multimode optical fiber may be shown in FIG. 12, and details are not described in this embodiment of the present invention.

The optical signal transmission system disclosed in this embodiment of the present invention can reduce a quantity of wavelengths in a multimode optical fiber by performing bit rate allocation on a binary signal at a transmit end, thereby reducing interference between channels in the optical fiber for optical signal transmission; and in addition, reduce a quantity of transmission channels, thereby reducing crosstalk between transmission channels. A clock programmable serializer/deserializer is used at the transmit end, to adjust a channel baud rate of a transmission channel according to performance of a transmitter, so as to implement equalization of the system and optimize transmission performance. A proper layout of components at a receive end can balance a responsivity difference between a signal-mode (1310 nm) receiver (a first linear receiver) and a multi-mode (850 nm) receiver (a second linear receiver) in terms of performance, so as to ensure that when receivers have same power, electrical signals output by the two receivers have relatively good consistency in terms of amplitude and bit error feature; a wavelength spacing between two optical signals exceeds 200 nm, so that mutual interference between two transmission channels is reduced; and in addition, there are few photoelectric devices in the system (for example, there are only two linear receivers and two transmitters), so that costs are reduced.

Figure 7:
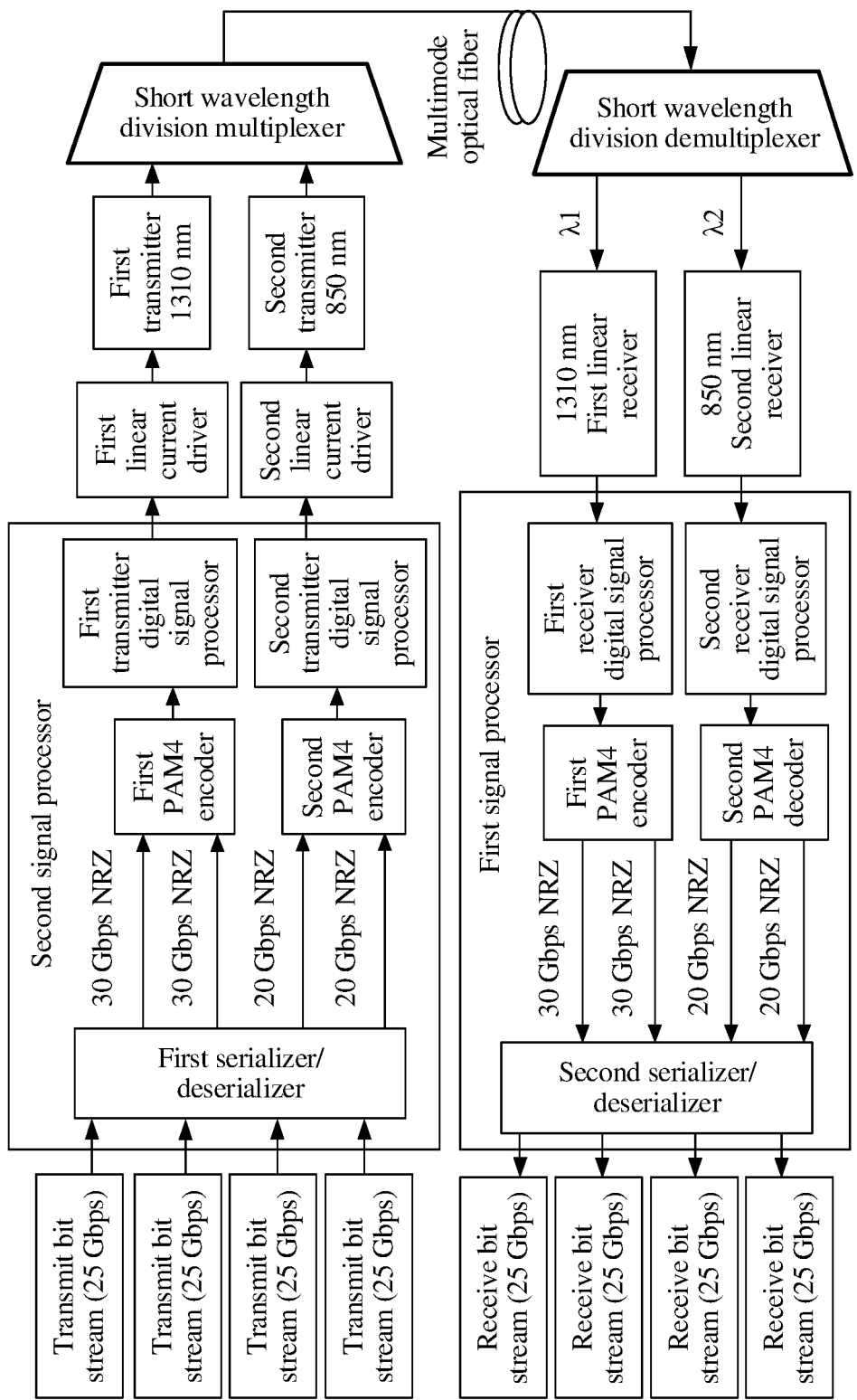
FIG. 7 is a schematic structural diagram of another optical signal transmission system according to an embodiment of the present invention.

Referring to FIG. 7, FIG. 7 is a schematic structural diagram of another optical signal transmission system according to an embodiment of the present invention. In FIG. 7, a received 100-Gbps binary signal (that is, four transmit bit streams whose bit rates are all 25 Gbps) is used as an example for description. As shown in FIG. 7, a principle of implementing optical signal transmission may be as follows:

A first serializer/deserializer performs, in a proportion of 3:2, bit rate allocation on the four transmit bit streams having a total bit rate of 100 Gbps, and outputs four NRZ signals whose bit rates are respectively 30 Gbps, 30 Gbps, 20 Gbps, and 20 Gbps. A first PAM4 encoder performs, in the PAM4 encoding manner shown in Table 1, encoding on the NRZ signals whose bit rates are 30 Gbps, to obtain an analog first PAM4 electrical signal. A second PAM4 encoder performs, in the PAM4 encoding manner shown in Table 1, encoding on the NRZ signals whose bit rates are 20 Gbps, to obtain an analog second PAM4 electrical signal. A first transmitter digital signal processor performs pre-emphasis addition processing on the first PAM4 electrical signal, to equalize the first PAM4 electrical signal to obtain a first electrical signal. A second transmitter digital signal processor performs pre-emphasis addition processing on the second PAM4 electrical signal, to equalize the second PAM4 electrical signal to obtain a second electrical signal. A first linear current driver performs linear amplification and offset addition on the first electrical signal, to obtain a third electrical signal used to drive a first transmitter. A second linear current driver performs linear amplification and offset addition on the second electrical signal, to obtain a fourth electrical signal used to drive a second transmitter. The first transmitter performs electrical-to-optical conversion on the third electrical signal to obtain a first optical signal whose wavelength is 1310 nm. The second transmitter performs electrical-to-optical conversion on the fourth electrical signal to obtain a second optical signal whose wavelength is 850 nm. A short wavelength division multiplexer is configured to multiplex the first optical signal and the second optical signal to a multimode optical fiber for transmission.

A short wavelength division demultiplexer demultiplexes the mixed optical signals received from the multimode optical fiber into a third optical signal whose wavelength is 1310 nm and that is to be sent to a first linear receiver and a fourth optical signal whose wavelength is 850 nm and that is to be sent to a second linear receiver. The first linear receiver and the second linear receiver perform electrical-to-optical conversion on the respective received optical signals to obtain corresponding voltage signals. A first receiver digital signal processor and a second receiver digital signal processor perform digital signal processing on the received voltage signals, so as to mitigate intersymbol interference, and obtain a first PAM4 electrical signal and a second PAM4 electrical signal. A PAM4 decoder performs encoding on a corresponding PAM4 electrical signal according to the decoding manner shown in Table 2, and each PAM4 decoder outputs two NRZ signals. A second serializer/deserializer processes the four NRZ signals to obtain four receive bit streams whose bit rates are separately 25 Gbps, and outputs the four bit streams to an external circuit for processing.

Figure 10:
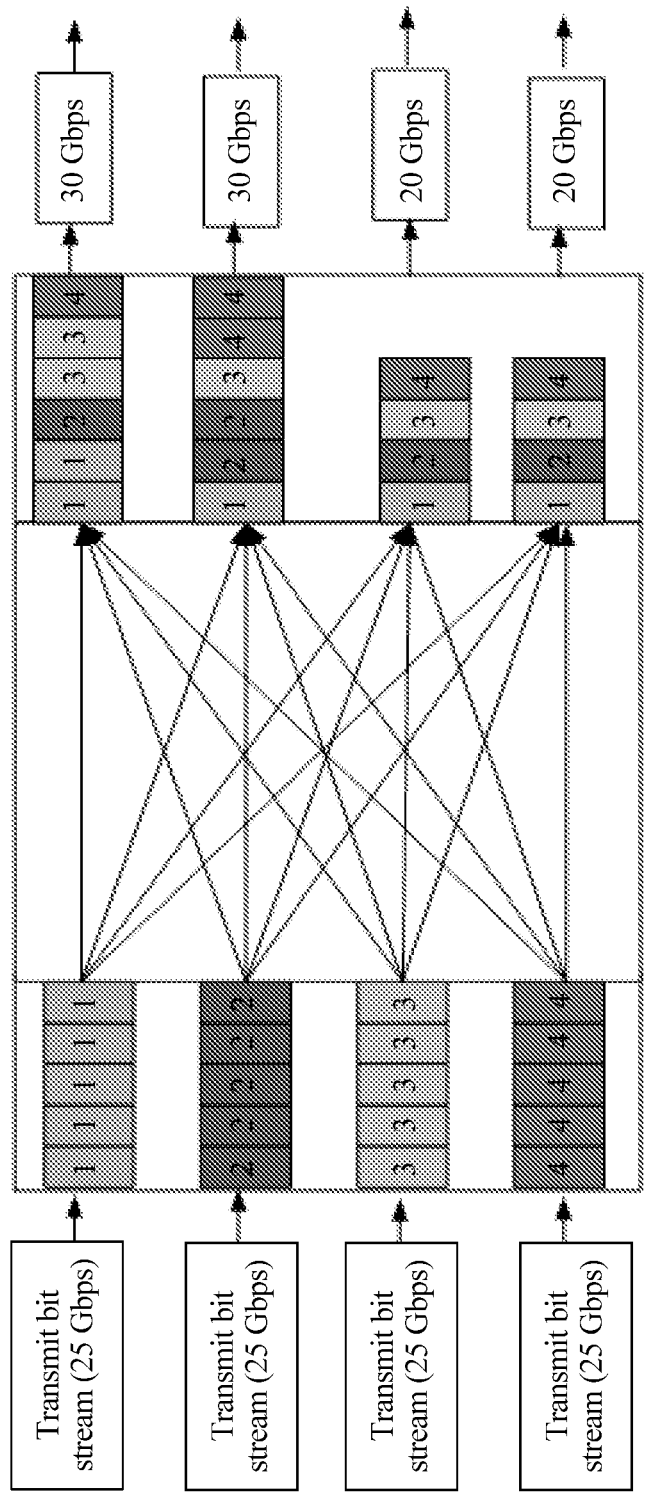
FIG. 10 is a schematic principle diagram of an implementation principle of a serializer/deserializer according to an embodiment of the present invention.

At a transmit end, the first serializer/deserializer may perform bit rate allocation on the four 25-Gbps transmit bit streams in a manner shown in FIG. 10, to obtain two 30-Gbps NRZ signals and two 20-Gbps NRZ signals. At a receive end, the second serializer/deserializer may allocate the two 30-Gbps NRZ signals and the two 20-Gbps NRZ signals according to a process reverse to that shown in FIG. 10, to obtain four 25-Gbps receive bit streams. FIG. 10 is a schematic principle diagram of an implementation principle of a serializer/deserializer according to an embodiment of the present invention.

It should be noted that the short wavelength division multiplexer may be a plastic lens, a location relationship among the short wavelength division multiplexer, the first transmitter, the second transmitter, and the multimode optical fiber may be shown in FIG. 11, and details are not described in this embodiment of the present invention. The short wavelength division demultiplexer may include a first plastic lens and a second plastic lens, a location relationship among the short wavelength division demultiplexer, the first linear receiver, the second linear receiver, and the multimode optical fiber may be shown in FIG. 12, and details are not described in this embodiment of the present invention.

In this embodiment of the present invention, a quantity of wavelengths transmitted in a multimode optical fiber is reduced in a bit rate allocation manner, thereby reducing interference between channels in the optical fiber for optical signal transmission; a clock programmable serializer/deserializer is used, so as to change channel baud rates of transmission channels of a signal-mode transmitter (a first transmitter) and a multi-mode transmitter (a second transmitter), thereby reducing intersymbol interference of each transmission channel; and there are few photoelectric devices, so that costs are reduced.

Figure 8:
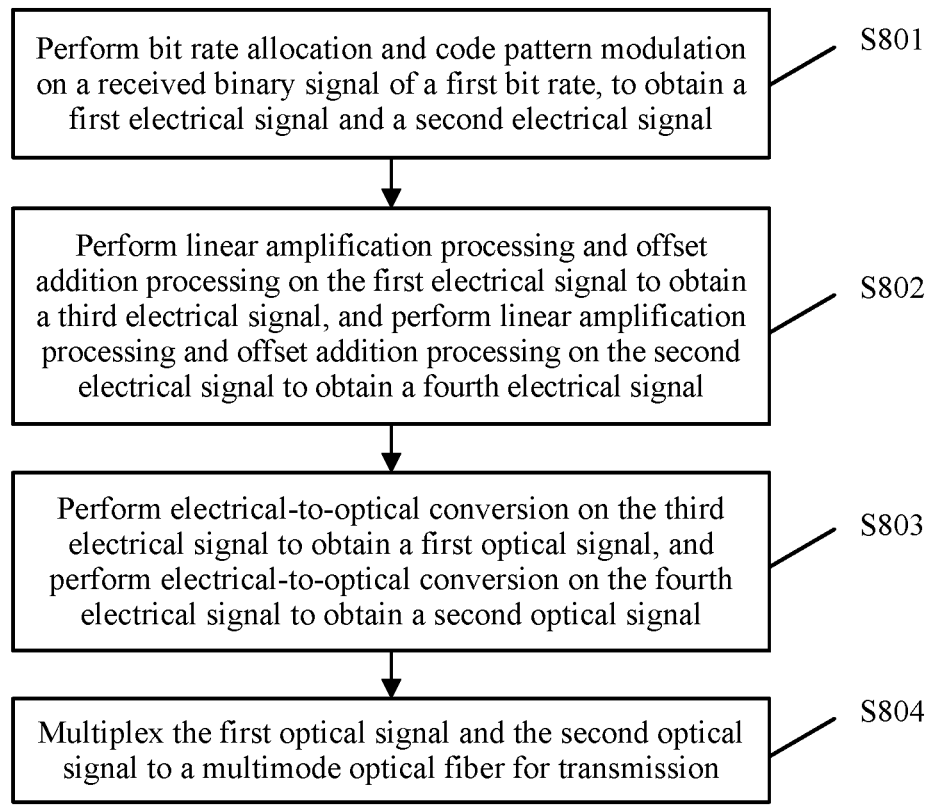
FIG. 8 is a schematic flowchart of an optical signal transmission method according to an embodiment of the present invention.

Referring to FIG. 8, FIG. 8 is a schematic flowchart of an optical signal transmission method according to an embodiment of the present invention. The method shown in FIG. 8 may be implemented by the optical signal transmission apparatus in FIG. 2 or FIG. 3. As shown in FIG. 8, the optical signal transmission method may include the following steps.

S801. Perform bit rate allocation and code pattern modulation on a received binary signal at a first bit rate, to obtain a first electrical signal and a second electrical signal.

S802. Perform linear amplification processing and offset addition processing on the first electrical signal to obtain a third electrical signal, and perform linear amplification processing and offset addition processing on the second electrical signal to obtain a fourth electrical signal.

S803. Perform electrical-to-optical conversion on the third electrical signal to obtain a first optical signal, and perform electrical-to-optical conversion on the fourth electrical signal to obtain a second optical signal.

S804. Multiplex the first optical signal and the second optical signal to a multimode optical fiber for transmission.

Optionally, the performing bit rate allocation and code pattern modulation on a received binary signal at a first bit rate, to obtain a first electrical signal and a second electrical signal may include:

performing bit rate allocation on the binary signal at the first bit rate according to a proportion, to obtain a first NRZ signal, a second NRZ signal, a third NRZ signal, and a fourth NRZ signal, where each of bit rates of the first NRZ signal and the second NRZ signal is a second bit rate, each of bit rates of the third NRZ signal and the fourth NRZ signal is a third bit rate, and the proportion is equal to a value obtained by dividing the second bit rate by the third bit rate;

performing PAM4 encoding on the first NRZ signal and the second NRZ signal to obtain a fifth electrical signal, and performing PAM4 encoding on the third NRZ signal and the fourth NRZ signal to obtain a sixth electrical signal; and performing an equalization operation on the fifth electrical signal to obtain the first electrical signal, and performing an equalization operation on the sixth electrical signal to obtain the second electrical signal.

Before PAM4 encoding is performed on the first NRZ signal and the second NRZ signal to obtain the fifth electrical signal, forward error correction encoding may further be performed on the first NRZ signal and the second NRZ signal; and before PAM4 encoding is performed on the third NRZ signal and the fourth NRZ signal to obtain the sixth electrical signal, forward error correction encoding may further be performed on the third NRZ signal and the fourth NRZ signal. This can reduce a bit error rate and improve reliability of optical signal transmission.

A wavelength of the first optical signal may be 1310 nm, and a wavelength of the second optical signal may be 850 nm.

It can be learnt that by implementing this embodiment of the present invention, a quantity of wavelengths transmitted in a multimode optical fiber can be reduced by performing bit rate allocation on a received binary signal, thereby reducing interference between channels in the optical fiber for optical signal transmission.

Figure 9:
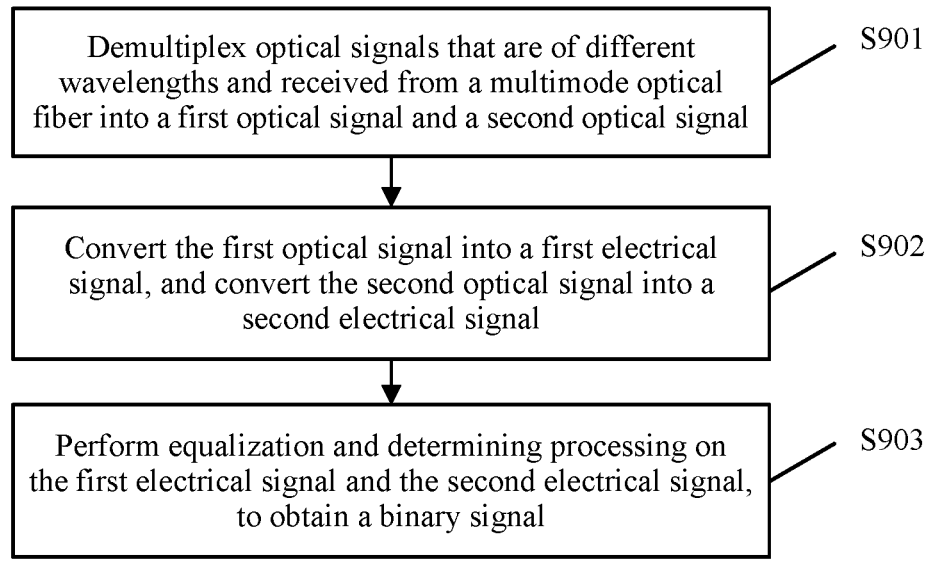
FIG. 9 is a schematic flowchart of another optical signal transmission method according to an embodiment of the present invention.

Referring to FIG. 9, FIG. 9 is a schematic flowchart of another optical signal transmission method according to an embodiment of the present invention. The method shown in FIG. 9 may be implemented by the optical signal transmission apparatus shown in FIG. 4 or FIG. 5. As shown in FIG. 9, the optical signal transmission method may include the following steps.

S901. Demultiplex optical signals that are at different wavelengths and received from a multimode optical fiber into a first optical signal and a second optical signal.

S902. Convert the first optical signal into a first electrical signal, and convert the second optical signal into a second electrical signal.

S903. Perform equalization and determining processing on the first electrical signal and the second electrical signal, to obtain a binary signal.

Optionally, the performing equalization and determining processing on the first electrical signal and the second electrical signal, to obtain a binary signal may include:

performing digital signal processing on the first electrical signal to obtain a third electrical signal, and performing digital signal processing on the second electrical signal to obtain a fourth electrical signal;

performing PAM4 decoding on the third electrical signal to obtain a first NRZ signal and a second NRZ signal, and performing PAM4 decoding on the fourth electrical signal to obtain a third NRZ signal and a fourth NRZ signal; and performing determining processing on the first NRZ signal, the second NRZ signal, the third NRZ signal, and the fourth NRZ signal, to obtain the binary signal.

After PAM4 decoding is performed on the third electrical signal to obtain the first NRZ signal and the second NRZ signal, forward error correction decoding may further be performed on the first NRZ signal and the second NRZ signal; and after PAM4 decoding is performed on the fourth electrical signal to obtain the third NRZ signal and the fourth NRZ signal, forward error correction decoding may further be performed on the third NRZ signal and the fourth NRZ signal. This can reduce a bit error rate and improve reliability of optical signal transmission.

A wavelength of the first optical signal may be 1310 nm, and a wavelength of the second optical signal may be 850 nm.

It can be learnt that by implementing this embodiment of the present invention, mutual interference between two optical signal transmission channels can be reduced, and optical signal transmission performance is improved.

It should be noted that, in the embodiments, the description of each embodiment has respective focuses. For a part that is not described in detail in an embodiment, reference may be made to related descriptions in other embodiments. In addition, a person skilled in the art should also appreciate that all the embodiments described in the specification are example embodiments, and the related actions and devices are not necessarily mandatory to the present invention.

A sequence of the steps of the method in the embodiments of the present invention may be adjusted, and certain steps may also be merged or removed according to an actual need.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (ROM), or a random access memory (RAM).

The optical signal transmission method, apparatus, and system provided in the embodiments of the present invention are described in detail above. The principle and implementation manner of the present invention are described herein through specific embodiments. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limit to the present invention.

What is claimed is:

1. An optical signal transmission apparatus comprising:
a short wavelength division multiplexer configured to connect to a multimode optical fiber;
a signal processor;
a first linear driver;
a second linear driver;
a first transmitter; and
a second transmitter, wherein:
the signal processor is configured to perform bit rate allocation and code pattern modulation on a received binary signal at a first bit rate, to obtain a first electrical signal to be sent to the first linear driver and a second electrical signal to be sent to the second linear driver;

the first linear driver is configured to perform linear amplification processing and offset addition processing on the first electrical signal, to obtain a third electrical signal used to drive the first transmitter;

the second linear driver is configured to perform linear amplification processing and offset addition processing on the second electrical signal, to obtain a fourth electrical signal used to drive the second transmitter;

the first transmitter is configured to convert the third electrical signal into a first optical signal and send the first optical signal to the short wavelength division multiplexer;

the second transmitter is configured to convert the fourth electrical signal into a second optical signal and send the second optical signal to the short wavelength division multiplexer;

the short wavelength division multiplexer is configured to multiplex the first optical signal and the second optical signal to the multimode optical fiber for transmission;

the received binary signal comprises a plurality of bit streams; and a quantity of optical signals multiplexed onto the multimode optical fiber for transmission is less than a quantity of bit streams in the plurality of bit streams.

2. The apparatus according to claim 1, wherein the signal processor comprises a serializer/deserializer, a first 4 pulse amplitude modulation (PAM4) encoder, a second PAM4 encoder, a first transmitter digital signal processor, and a second transmitter digital signal processor, wherein:

the serializer/deserializer is configured to perform bit rate allocation on the received binary signal according to a proportion, to obtain a first non-return to zero (NRZ) signal, a second NRZ signal, a third NRZ signal, and a fourth NRZ signal, wherein each of bit rates of the first NRZ signal and the second NRZ signal is a second bit rate, each of bit rates of the third NRZ signal and the fourth NRZ signal is a third bit rate, and the proportion is equal to a value obtained by dividing the second bit rate by the third bit rate;

the first PAM4 encoder is configured to perform PAM4 encoding on the first NRZ signal and the second NRZ signal to obtain a fifth electrical signal;

the second PAM4 encoder is configured to perform PAM4 encoding on the third NRZ signal and the fourth NRZ signal to obtain a sixth electrical signal;

the first transmitter digital signal processor is configured to perform an equalization operation on the fifth electrical signal, to obtain the first electrical signal; and the second transmitter digital signal processor is configured to perform an equalization operation on the sixth electrical signal, to obtain the second electrical signal.

3. The apparatus according to claim 1, wherein the short wavelength division multiplexer is a plastic lens.

4. An optical signal transmission apparatus comprising:
a short wavelength division demultiplexer configured to connect to a multimode optical fiber;
a first linear receiver;
a second linear receiver; and
a signal processor, wherein:
the short wavelength division demultiplexer is configured to demultiplex optical signals that are at different wavelengths and received from the multimode optical fiber into a first optical signal to be sent to the first linear receiver and a second optical signal to be sent to the second linear receiver;

the first linear receiver is configured to convert the first optical signal into a first electrical signal;

the second linear receiver is configured to convert the second optical signal into a second electrical signal;

the signal processor is configured to perform equalization and determining processing on the first electrical signal and the second electrical signal to obtain a binary signal;

the binary signal comprises a plurality of bit streams; and a quantity of bit streams in the plurality of bit streams is greater than a quantity of the optical signals that are at different wavelengths and received from the multimode optical fiber.

5. The apparatus according to claim 4, wherein the signal processor comprises a serializer/deserializer, a first 4 pulse amplitude modulation (PAM4) decoder, a second PAM4 decoder, a first receiver digital signal processor, and a second receiver digital signal processor, wherein:

the first receiver digital signal processor is configured to perform digital signal processing on the first electrical signal, to obtain a third electrical signal;

the second receiver digital signal processor is configured to perform digital signal processing on the second electrical signal, to obtain a fourth electrical signal;

the first PAM4 decoder is configured to perform PAM4 decoding on the third electrical signal to obtain a first non-return to zero (NRZ) signal and a second NRZ signal;

the second PAM4 decoder is configured to perform PAM4 decoding on the fourth electrical signal to obtain a third NRZ signal and a fourth NRZ signal; and the serializer/deserializer is configured to perform determining processing on the first NRZ signal, the second NRZ signal, the third NRZ signal, and the fourth NRZ signal, to obtain the binary signal.

6. The apparatus according to claim 4, wherein the short wavelength division demultiplexer comprises a first plastic lens and a second plastic lens.

7. An optical signal transmission method, the method comprising:

performing bit rate allocation and code pattern modulation on a received binary signal at a first bit rate, to obtain a first electrical signal and a second electrical signal;

performing linear amplification processing and offset addition processing on the first electrical signal to obtain a third electrical signal, and performing linear amplification processing and offset addition processing on the second electrical signal to obtain a fourth electrical signal;

performing electrical-to-optical conversion on the third electrical signal to obtain a first optical signal, and performing electrical-to-optical conversion on the fourth electrical signal to obtain a second optical signal; and multiplexing the first optical signal and the second optical signal to a multimode optical fiber for transmission, wherein the received binary signal comprises a plurality of bit streams, and wherein a quantity of optical signals multiplexed onto the multimode optical fiber for transmission is less than a quantity of bit streams in the plurality of bit streams.

8. The method according to claim 7, wherein the performing the bit rate allocation and the code pattern modulation on the received binary signal at the first bit rate, to obtain the first electrical signal and the second electrical signal comprises:

performing bit rate allocation on the received binary signal according to a proportion, to obtain a first non-return to zero (NRZ) signal, a second NRZ signal, a third NRZ signal, and a fourth NRZ signal, wherein each of bit rates of the first NRZ signal and the second NRZ signal is a second bit rate, each of bit rates of the third NRZ signal and the fourth NRZ signal is a third bit rate, and the proportion is equal to a value obtained by dividing the second bit rate by the third bit rate;

performing PAM4 encoding on the first NRZ signal and the second NRZ signal to obtain a fifth electrical signal, and performing PAM4 encoding on the third NRZ signal and the fourth NRZ signal to obtain a sixth electrical signal; and performing an equalization operation on the fifth electrical signal to obtain the first electrical signal, and performing an equalization operation on the sixth electrical signal to obtain the second electrical signal.

9. An optical signal transmission method, the method comprising:

demultiplexing optical signals that are at different wavelengths and received from a multimode optical fiber into a first optical signal and a second optical signal;

converting the first optical signal into a first electrical signal, and converting the second optical signal into a second electrical signal; and performing equalization and determining processing on the first electrical signal and the second electrical signal, to obtain a binary signal, wherein the binary signal comprises a plurality of bit streams, and wherein a quantity of bit streams in the plurality of bit streams is greater than a quantity of the optical signals that are at different wavelengths and received from the multimode optical fiber.

10. The method according to claim 9, wherein the performing the equalization and determining processing on the first electrical signal and the second electrical signal, to obtain the binary signal comprises:

performing digital signal processing on the first electrical signal to obtain a third electrical signal, and performing digital signal processing on the second electrical signal to obtain a fourth electrical signal;

performing PAM4 decoding on the third electrical signal to obtain a first non-return to zero (NRZ) signal and a second NRZ signal, and performing PAM4 decoding on the fourth electrical signal to obtain a third NRZ signal and a fourth NRZ signal; and performing determining processing on the first NRZ signal, the second NRZ signal, the third NRZ signal, and the fourth NRZ signal, to obtain the binary signal.

* * * * *